(12) United States Patent
Lee et al.

(10) Patent No.: US 10,529,317 B2
(45) Date of Patent: Jan. 7, 2020

(54) NEURAL NETWORK TRAINING APPARATUS AND METHOD, AND SPEECH RECOGNITION APPARATUS AND METHOD

(71) Applicant: Samsung Electronics Co., Ltd., Suwon-si (KR)

(72) Inventors: Ho Shik Lee, Seongnam-si (KR); Hee Youl Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/344,110

(22) Filed: Nov. 4, 2016

(65) Prior Publication Data

US 2017/0133006 A1 May 11, 2017

(30) Foreign Application Priority Data

Nov. 6, 2015 (KR) ........................ 10-2015-0156152

(51) Int. Cl.
*G10L 15/00* (2013.01)
*G10L 15/06* (2013.01)
*G10L 15/16* (2006.01)
*G10L 15/02* (2006.01)

(52) U.S. Cl.
CPC ............ *G10L 15/063* (2013.01); *G10L 15/02* (2013.01); *G10L 15/16* (2013.01); *G10L 2015/025* (2013.01)

(58) Field of Classification Search
CPC ...................................................... G10L 15/00
USPC ....... 704/9, 4, 246, 245, 239, 233, 235, 232, 704/500; 455/456.1; 381/94.1
See application file for complete search history.

(56) References Cited

U.S. PATENT DOCUMENTS

| 5,153,923 | A | 10/1992 | Matsuba et al. | |
|---|---|---|---|---|
| 5,806,053 | A | 9/1998 | Tresp et al. | |
| 6,615,170 | B1 * | 9/2003 | Liu | G10L 25/78 |
| | | | | 704/231 |
| 6,876,966 | B1 * | 4/2005 | Deng | G06K 9/6256 |
| | | | | 704/233 |
| 8,463,722 | B2 | 6/2013 | Knoblauch | |

(Continued)

FOREIGN PATENT DOCUMENTS

| JP | 2000-259598 A | 9/2000 |
|---|---|---|
| JP | 3614662 B2 | 1/2005 |

(Continued)

OTHER PUBLICATIONS

C. Bucilă et al. "Model Compression." *Proceedings of the 12th ACM SIGKDD International Conference on Knowledge Discovery and Data Mining.*, Philadelphia, PA, Aug. 2006. (7 pages in English).

(Continued)

*Primary Examiner* — Michael C Colucci
(74) *Attorney, Agent, or Firm* — NSIP Law

(57) ABSTRACT

A neural network training apparatus includes a primary trainer configured to perform a primary training of a neural network model based on clean training data and target data corresponding to the clean training data; and a secondary trainer configured to perform a secondary training of the neural network model on which the primary training has been performed based on noisy training data and an output probability distribution of an output class for the clean training data calculated during the primary training of the neural network model.

20 Claims, 7 Drawing Sheets

(56) References Cited

U.S. PATENT DOCUMENTS

| | | | |
|---|---|---|---|
| 8,639,502 B1* | 1/2014 | Boucheron | G10L 21/02 381/94.1 |
| 8,725,669 B1* | 5/2014 | Fu | A61B 5/0476 706/22 |
| 8,838,446 B2 | 9/2014 | Jeong et al. | |
| 9,299,347 B1* | 3/2016 | Siohan | G10L 15/02 |
| 9,679,224 B2* | 6/2017 | Barker | G06K 9/6255 |
| 2006/0031066 A1* | 2/2006 | Hetherington | G10L 21/0208 704/226 |
| 2006/0212288 A1* | 9/2006 | Sethy | G06F 17/2715 704/10 |
| 2006/0277028 A1* | 12/2006 | Chen | G06F 17/2715 704/4 |
| 2009/0271195 A1* | 10/2009 | Kitade | G10L 15/065 704/239 |
| 2010/0145687 A1* | 6/2010 | Huo | G10L 21/0208 704/206 |
| 2011/0060587 A1* | 3/2011 | Phillips | G10L 15/30 704/235 |
| 2011/0191101 A1* | 8/2011 | Uhle | G10L 21/0208 704/205 |
| 2011/0257974 A1* | 10/2011 | Kristjansson | G10L 21/0208 704/246 |
| 2012/0010881 A1* | 1/2012 | Avendano | G10L 21/0208 704/226 |
| 2013/0030803 A1* | 1/2013 | Liao | G10L 15/20 704/233 |
| 2013/0096915 A1* | 4/2013 | Rennie | G10L 21/0208 704/233 |
| 2014/0142929 A1 | 5/2014 | Seide et al. | |
| 2015/0019214 A1* | 1/2015 | Wang | G10L 15/34 704/232 |
| 2015/0112672 A1* | 4/2015 | Giacobello | H04M 9/082 704/233 |
| 2016/0093313 A1* | 3/2016 | Vickers | G10L 25/78 704/232 |
| 2016/0189730 A1* | 6/2016 | Du | G10L 21/0272 704/233 |
| 2016/0275947 A1* | 9/2016 | Li | G10L 15/20 |
| 2016/0284346 A1* | 9/2016 | Visser | G10L 15/16 |

FOREIGN PATENT DOCUMENTS

| | | |
|---|---|---|
| JP | 5027859 B2 | 9/2012 |
| KR | 10-0199296 B1 | 6/1999 |
| KR | 10-0576803 B1 | 5/2006 |
| KR | 10-2014-0145801 A | 12/2014 |

OTHER PUBLICATIONS

G. Hinton et al. "Distilling the Knowledge in a Neural Network" *arXiv preprint arXiv:1503.02531v1*, Mar. 9, 2015, pp. 1-9.

European Search Report dated Mar. 17, 2017 in corresponding European patent application No. 16197493.6 (11 pages in English).

Du, Jun, et al. "Robust speech recognition with speech enhanced deep neural networks." Interspeech. 2014.

Mirsamadi, Seyedmahdad, and John HL Hansen. "A study on deep neural network acoustic model adaptation for robust far-field speech recognition." Interspeech. 2015.

Xydeas, Costas S., and Lin Cong. "Robust speech recognition using fuzzy matrix quantisation, neural networks and Hidden Markov models." European Signal Processing Conference, 1996. EUSIPCO 1996. 8th. IEEE, 1996.

Yin, Shi, et al. "Noisy training for deep neural networks in speech recognition." *EURASIP Journal on Audio, Speech, and Music Processing*, vol. 2015, No. 1, Jan. 20, 2015. (14 pages in English).

European Office Action to Attend Oral Proceedings dated May 7, 2018 in European Patent Application No. 16197493.6 (6 pages in English).

\* cited by examiner

NEURAL NETWORK TRAINING APPARATUS AND METHOD, AND SPEECH RECOGNITION APPARATUS AND METHOD

CROSS-REFERENCE TO RELATED APPLICATIONS

This application claims the benefit under 35 USC 119(a) of Korean Patent Application No. 10-2015-0156152 filed on Nov. 6, 2015, in the Korean Intellectual Property Office, the entire disclosure of which is incorporated herein by reference for all purposes.

BACKGROUND

1. Field

The following description relates to a neural network training apparatus and method, and a speech recognition apparatus and method.

2. Description of Related Art

The latest speech recognition technology is attracting a lot of attention compared to previous speech recognition technology. The reason for this is that when speech recognition technology is implemented, the use of Internet information, e-commerce, or a variety of ubiquitous environments may be more conveniently operated through speech in addition to Internet access or the use of office or other services may be enabled to meet a variety of a user's needs even when the user is driving a vehicle or performing other tasks in which it is difficult for a user to use his or her hands.

An important problem in speech recognition technology is to efficiently remove noise from a surrounding environment. A mismatch between a training environment and an actual speech recognition environment due to the noise from the surrounding environment is one of the main causes of a decrease in the speech recognition performance of a speech recognition system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network training apparatus includes a primary trainer configured to perform a primary training of a neural network model based on clean training data and target data corresponding to the clean training data; and a secondary trainer configured to perform a secondary training of the neural network model on which the primary training has been performed based on noisy training data and a probability distribution of an output class for the clean training data calculated during the primary training of the neural network model.

The secondary trainer may be further configured to perform the secondary training of the neural network model on which the primary training has been performed using the noisy training data as an input and the probability distribution of the output class for the clean training data calculated during the primary training of the neural network model as a target.

The noisy training data may include data in which the clean training data is distorted or the clean training data and training noise data are mixed.

The neural network model may be a neural network-based acoustic model.

The primary trainer may be further configured to perform the primary training using a first objective function that performs training of the neural network model to obtain the target data from the clean training data.

The secondary trainer may be further configured to perform the secondary training using a second objective function that is a combination of the probability distribution of the output class for the clean training data calculated during the primary training of the neural network model and an activation function of an output layer of the neural network model.

The secondary trainer may be further configured to perform the secondary training using a second objective function that is a weighted sum of an objective function that performs training of the neural network model to obtain the target data from the clean training data and an objective function that is a combination of the probability distribution of the output class for the clean training data calculated during the primary training of the neural network model and an activation function of an output layer of the neural network model.

In another general aspect, a neural network training method includes performing a primary training of a neural network model based on clean training data and target data corresponding to the clean training data; and performing a secondary training of the neural network model on which the primary training has been performed based on noisy training data and a probability distribution of an output class for the clean training data calculated during the primary training of the neural network model.

The secondary training may include performing the secondary training of the neural network model on which the primary training has been performed using the noisy training data as an input and the probability distribution of the output class for the clean training data calculated during the primary training of the neural network model as a target.

The noisy training data may include data in which the clean training data is distorted or the clean training data and training noise data are mixed.

The neural network model may be a neural network-based acoustic model.

The performing of the primary training may include performing the primary training using a first objective function that performs training of the neural network model to obtain the target data from the clean training data.

The performing of the secondary training may include performing the secondary training using a second objective function that is a combination of the probability distribution of the output class for the clean training data calculated during the primary training of the neural network model and an activation function of an output layer of the neural network model.

The performing of the secondary training may include performing the secondary training using a second objective function that is a weighted sum of an objective function that performs training of the neural network model to obtain the target data from the clean training data and an objective function that is a combination of the probability distribution of the output class for the clean training data calculated during the primary training of the neural network model and an activation function of an output layer of the neural network model.

In another general aspect, a computer-readable storage medium stores instructions, that when executed by a processor, cause the processor to perform the method described above.

In another general aspect, a speech recognition apparatus includes a feature extractor configured to extract a feature of noisy speech data; and a phoneme probability calculator configured to calculate a probability of a phoneme corresponding to the extracted feature using an acoustic model; and the acoustic model is an acoustic model on which a primary training has been performed based on speech training data and a phoneme sequence corresponding to the speech training data, and a secondary training has been performed based on noisy speech training data and a probability distribution of an output class for the speech training data calculated during the primary training of the acoustic model.

The primary training of the acoustic model may be performed using the speech training data as an input and the phoneme sequence corresponding to the speech training data as a target.

The secondary training of the acoustic model may be performed using the noisy speech training data as an input and the probability distribution of the output class for the speech training data calculated during the primary training of the acoustic model as a target.

The noisy speech training data may include data in which the speech training data is distorted or the speech training data and training noise data are mixed.

The acoustic model may be a neural network-based acoustic model.

The primary training of the acoustic model may be performed using a first objective function that performs training of the acoustic model to obtain a phoneme from the speech training data.

The secondary training of the acoustic model may be performed using a second objective function that is a combination of the probability distribution of the output class for the speech training data calculated during the primary training of the acoustic model and an activation function of an output layer of the acoustic model.

The secondary training of the acoustic model may be performed using a second objective function that is a weighted sum of an objective function that performs training of the acoustic model to obtain a phoneme from the speech training data and an objective function that is a combination of the probability distribution of the output class for the speech training data calculated during the primary training of the acoustic model and an activation function of an output layer of the acoustic model.

In another general aspect, a neural network training apparatus includes a primary trainer configured to perform a primary training of a neural network model based on clean training data and hard target data; and a secondary trainer configured to perform a secondary training of the neural network model on which the primary training has been performed based on noisy training data and soft target data obtained during the primary training of the neural network model.

The noisy training data may be obtained by distorting the clean training data or mixing the clean training data with noise.

The soft target data may be a probability distribution of an output class for the clean training data calculated during the primary training of the neural network model.

The secondary trainer may be further configured to perform the secondary training based on the noisy training data, the soft target data, and an activation function of an output layer of the neural network model.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
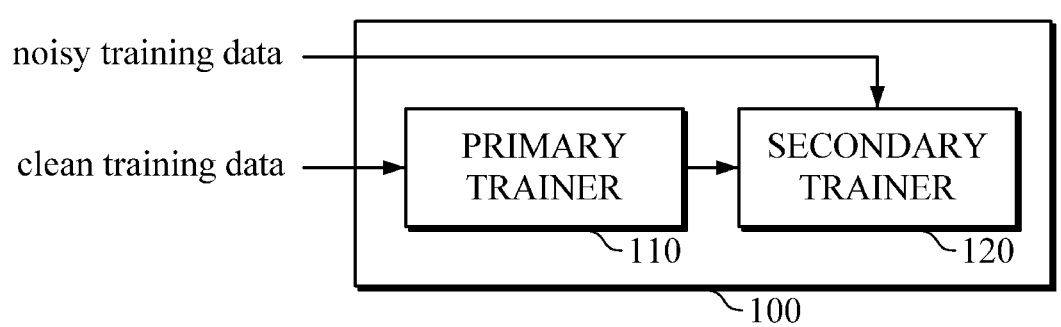
FIG. 1 is a diagram illustrating an example of a neural network training apparatus.

FIG. 1 is a diagram illustrating an example of a neural network training apparatus.

A neural network training apparatus 100 is an apparatus that trains a neural network model using a multi-condition training (MCT) technique. In one example, the neural network model is a neural network-based acoustic model including a plurality of hidden layers, but this is a merely an example, and the neural network model is not limited thereto. The neural network model may be trained using a typical back propagation technique (for example, a gradient descent algorithm, a stochastic gradient descent algorithm, or other back propagation technique).

Referring to FIG. 1, the neural network training apparatus 100 may include a primary trainer 110 and a secondary trainer 120.

The primary trainer 110 performs a primary training of the neural network model based on clean training data and target data corresponding to the clean training data. The clean training data is training data that does not contain noise. In one example, the primary trainer 110 performs the primary training of the neural network model using the clean training data as an input and the target data corresponding to the clean training data as a target.

In one example, the primary trainer 110 performs the primary training of the neural network model using an objective function (hereinafter, referred to as a first objective function) that performs training of the neural network model to obtain the corresponding target data from the clean training data. Although the term "objective function" is used in this application, another term that may be used for this function is "loss function." For example, the first objective function may use cross-entropy that is mainly used in multi-class classification. This may be represented by Equation 1 below.

$$L_A = -\sum_{n=1}^{N}\sum_{k=1}^{K} t_{nk} \ln y_k(X_n) \qquad (1)$$

In Equation 1, n denotes an index of a sample of input data, that is, clean training data, k denotes an index of an output class, $X_n$ denotes an n-th sample of the clean training data, and $y_k(X_n)$ denotes an activation function of an output layer of a neural network model. When a k-th output class for $X_n$ is a target class, $t_{nk}$ has a value of 1, and otherwise, $t_{nk}$ has a value of 0.

The secondary trainer 120 performs a secondary training of the neural network model on which the primary network training has been performed based on noisy training data and a probability distribution of an output class for the clean training data calculated during the primary training of the neural network model. The probability distribution of the output class for the clean training data calculated during the primary training of the neural network model is the output of the neural network model after the primary training has been completed. In one example, the secondary trainer 120 performs the secondary training of the neural network model using the noisy training data as an input and the probability distribution of the output class for the clean training data calculated during the primary training of the neural network model as a target. The noisy training data may be data in which the clean training data is distorted, or in which clean training data and training noise data are mixed. For example, the noisy training data may be data in which the clean training data and a variety of noise data are mixed, or may be distorted data generated by adding a variety of modifications (for example, rotation, partial covering, a change in color or intensity of illumination, or other modifications in the case of image data, and reverberation or other modifications in the case of speech data) to the clean training data.

In one example, the secondary trainer 120 performs the secondary training of the neural network model on which the primary training has been performed using an objective function (hereinafter, referred to as a second objective function) that performs training to obtain the probability distribution of the output class for the clean training data calculated during the primary training of the neural network model. The second objective function may be composed of a combination of the probability distribution of the output class for the clean training data calculated during the primary training of the neural network model and the activation function of the output layer of the neural network model.

For example, the second objective function may use cross-entropy that is mainly used in multi-class classification. This may be represented by Equation 2 below.

$$L_B = -\sum_{n=1}^{N}\sum_{k=1}^{K} s_{nk} \ln y_k(X_n) \qquad (2)$$

In Equation 2, n denotes an index of a sample of input data, that is, noisy training data, k denotes an index of an output class, $X_n$ denotes an n-th sample of the noisy training data, and $y_k(X_n)$ denotes an activation function of an output layer of a neural network model. $s_{nk}$ denotes a probability distribution of a k-th output class for an n-th clean training data sample as the probability distribution of the output class of the clean training data calculated during the primary training of the neural network model.

In another example, the second objective function may use a Euclidean distance that is mainly used in regression. This may be represented by Equation 3 below.

$$L_B = -\frac{1}{2}\sum_{n=1}^{N}\sum_{k=1}^{K} \|s_{nk} - y_k(X_n)\|^2 \qquad (3)$$

In Equation 3, n denotes an index of a sample of input data, that is, noisy training data, k denotes an index of an output class, $X_n$ denotes an n-th sample of the noisy training data, and $y_k(X_n)$ denotes an activation function of an output layer of a neural network model. $s_{nk}$ denotes a probability distribution of a k-th output class for an n-th clean training data sample as the probability distribution of the output class of the clean training data calculated during the primary training of the neural network model.

In another example, the second objective function may be composed of a weighted sum of the objective function of Equation 1 and the objective function of Equation 2, or a weighted sum of the objective function of Equation 1 and the objective function of Equation 3. This may be represented by Equations 4 and 5 below.

$$L_B = -\sum_{n=1}^{N}\sum_{k=1}^{K} (1-\lambda)t_{nk}\ln y_k(X_n) + \lambda s_{nk}\ln y_k(X_n) \qquad (4)$$

$$L_B = -\sum_{n=1}^{N}\sum_{k=1}^{K} (1-\lambda)t_{nk}\ln y_k(X_n) + \frac{1}{2}\lambda\|s_{nk} - y_k(X_n)\|^2 \qquad (5)$$

In Equations 4 and 5, λ denotes a weight, and may be set to various values according to the performance and application of a system.

Examples in which the primary trainer 110 and the secondary trainer 120 train the neural network model using separate objective functions have been described so far, but the first objective function and the second objective function may be integrated into a single integrated objective function.

In one example, the integrated objective function may be represented by Equation 6 below.

$$L_C = -\sum_{n=1}^{N}\sum_{k=1}^{K}(1-\lambda(d_n))t_{nk}(d_n)\ln y_k(X_n) + \lambda(d_n)s_{nk}(d_n)\ln y_k(X_n) \quad (6)$$

In Equation 6, $d_n$ has a value of 0 when an input is the clean training data, and has a value of 1 when the input is the noisy training data. $\lambda(d_n)$ denotes a weight, and has a value of 0 when $d_n$ is 0 (i.e., when the input is the clean training data). $\lambda(d_n)$ may be set to various values according to the performance and application of a system when $d_n$ is 1 (i.e., when the input is the noisy training data).

In another example, the integrated objective function may be represented by Equation 7 below.

$$L_C = -\sum_{n=1}^{N}\sum_{k=1}^{K}(1-\lambda(d_n))t_{nk}(d_n)\ln y_k(X_n) + \frac{1}{2}\lambda(d_n)\|s_{nk}(d_n) - y_k(X_n)\|^2 \quad (7)$$

In Equation 7, $d_n$ has a value of 0 when an input is the clean training data, and has a value of 1 when the input is the noisy training data. $\lambda(d_n)$ denotes a weight, and has a value of 0 when $d_n$ is 0 (i.e., when the input is the clean training data). $\lambda(d_n)$ may be set to various values according to the performance and application of a system when $d_n$ is 1 (i.e., when the input is the noisy training data).

When one of the integrated objective functions of Equations 6 and 7 is used, the primary trainer 110 trains the neural network model using the integrated objective function with $d_n$ and $\lambda(d_n)$ both set to 0 and using the clean training data as an input and target data corresponding to the clean training data as a target. The secondary trainer 120 trains the neural network model on which the primary network training has been performed using the integrated objective function with $d_n$ set to 1 and $\lambda(d_n)$ set to various values according to the performance and application of a system and using the noisy training data as an input and a probability distribution of an output class for the clean training data calculated during the primary training of the neural network model as a target.

Figure 2:
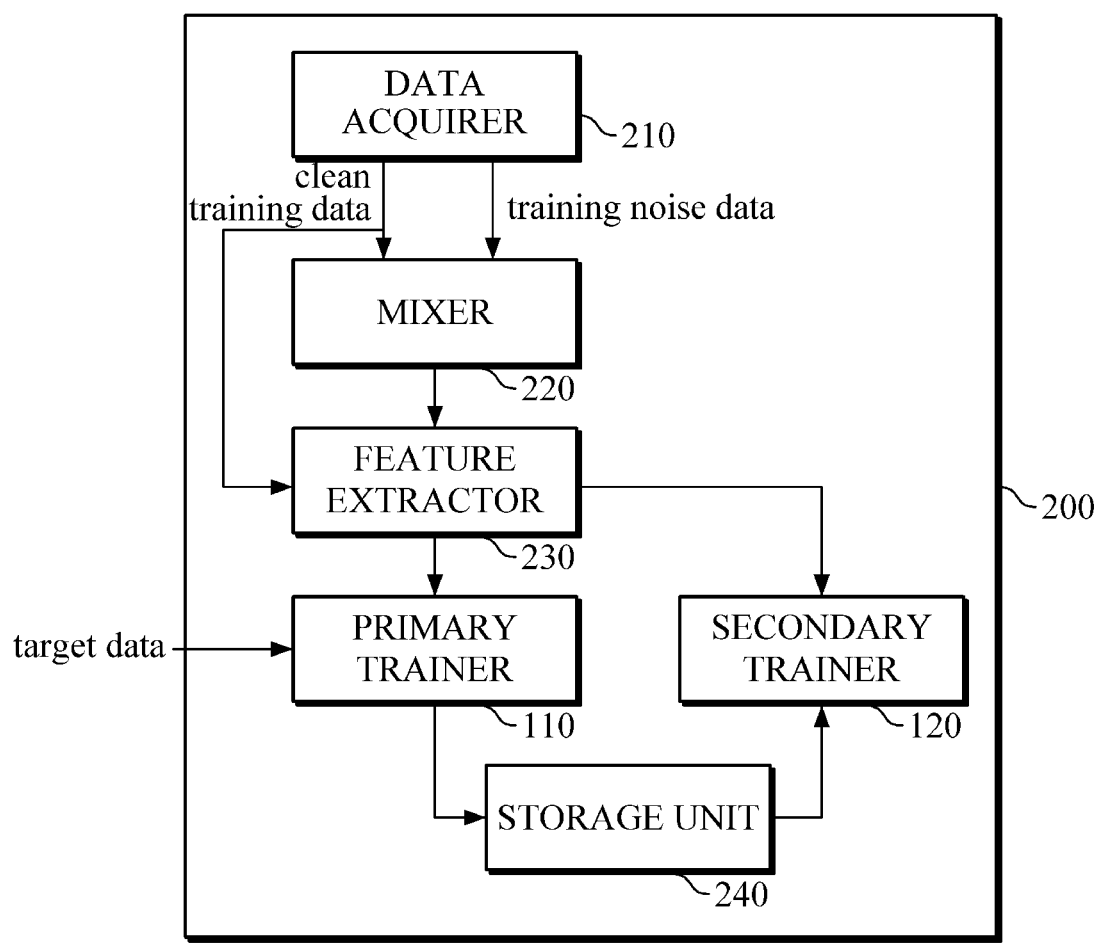
FIG. 2 is a diagram illustrating another example of a neural network training apparatus.

FIG. 2 is a diagram illustrating another example of a neural network training apparatus.

Referring to FIG. 2, when compared to the neural network training apparatus 100 of FIG. 1, a neural network training apparatus 200 further includes a data acquirer 210, a mixer 220, a feature extractor 230, and a storage unit 240.

The data acquirer 210 acquires clean training data and training noise data for training a neural network model. In one example, the data acquirer 210 acquires the clean training data and the training noise data from a predetermined database (DB) or external device.

The mixer 220 generates noisy training data by mixing the clean training data and the training noise data. Alternatively, the mixer 220 generates the noisy training data by adding a variety of modifications (for example, rotation, partial covering, a change in color or intensity of illumination, or other modifications in the case of image data, and reverberation or other modifications in the case of speech data) to the clean training data.

The feature extractor 230 extracts features (for example, a filterbank) of the clean training data and the noisy training data using a predetermined algorithm. There is no limitation on the type and function of the predetermined algorithm so long as it can extract features through which each of the clean training data and the noisy training data can be identified from the clean training data and the noisy training data.

The primary trainer 110 performs a primary training of the neural network model using feature data of the clean training data extracted by the feature extractor 230 as an input, and the secondary trainer 120 performs a secondary training of the neural network model on which the primary training has been performed using feature data of the noisy training data extracted by the feature extractor 230 as an input.

The storage unit 240 stores a primary training result of the neural network model obtained by the primary trainer 110, and a probability distribution of an output class for the clean training data calculated during the primary training of the neural network model.

The storage unit 240 may include as a storage medium any one or any combination of any two or more of a flash memory. a hard disk, a MultiMediaCard (MMC), an MMC-micro, a memory card (e.g., a secure digital (SD) memory card or an extreme digital (XD) memory card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

In the example in FIG. 2, the storage unit 240 is included in the neural network training apparatus 200, but is not limited thereto. In other words, the storage unit 240 may be located inside the neural network training apparatus 200 as shown in FIG. 2, or may be a separate external component connected to the neural network training apparatus 200.

Hereinafter, an apparatus for speech recognition using an acoustic model generated by the neural network training apparatus 100 of FIG. 1 or the neural network training apparatus 200 of FIG. 2 will be described in detail.

Figure 3:
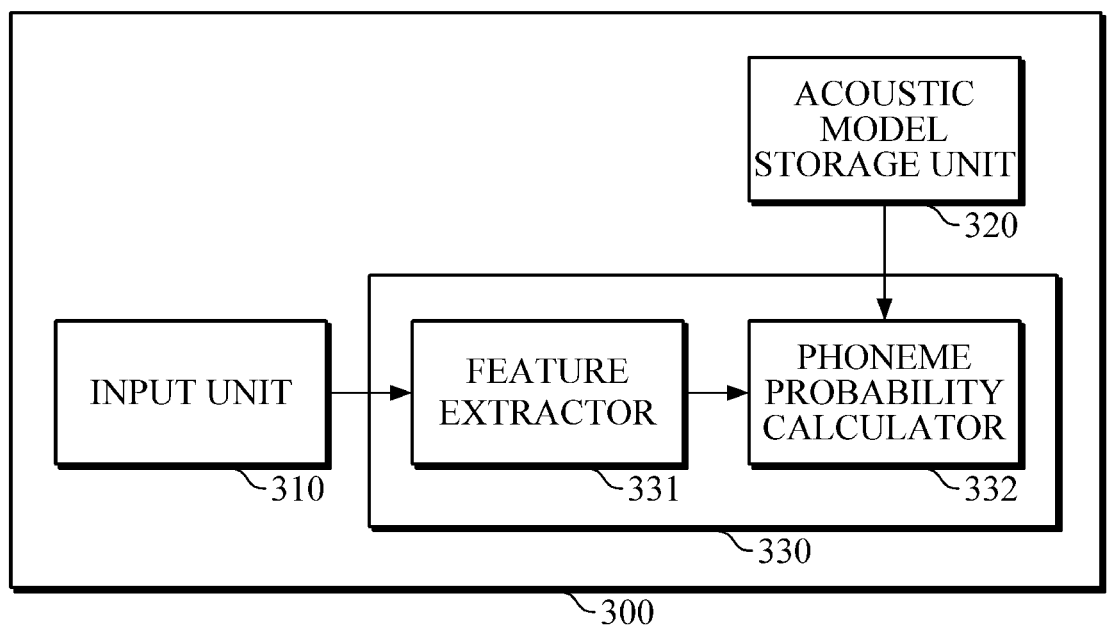
FIG. 3 is a block diagram illustrating an example of a speech recognition apparatus.

FIG. 3 is a block diagram illustrating an example of a speech recognition apparatus. A speech recognition apparatus 300 may be manufactured in the form of a hardware chip and mounted in an electronic device. The electronic device may be a TV, a navigation unit, a vehicle electronic device, a smart phone, a tablet PC, a smart watch, a desktop computer, a laptop PC, or a wearable device, but is not limited thereto.

Referring to FIG. 3, the speech recognition apparatus 300 includes an input unit 310, an acoustic model storage unit 320, and a calculator 330.

The input unit 310 receives noisy speech data on which speech recognition is to be performed. The noisy speech data is speech data mixed with noise.

The acoustic model storage unit 320 stores an acoustic model trained in advance. The acoustic model may be a neural network-based acoustic model trained by the neural network training apparatus 100 or 200.

In one example, the acoustic model is an acoustic model that is trained using an MCT technique as the neural network-based acoustic model. For example, the acoustic model is an acoustic model on which a primary training has been performed based on speech training data and a phoneme sequence corresponding to the speech training data, and a secondary training has been performed based on noisy speech training data and a probability distribution of an output class for the speech training data calculated during the primary training of the acoustic model. The training noisy speech training data may be data obtained by mixing the speech training data and training noise data.

The acoustic model may be trained using any of the objective functions of Equations 1 to 7. For example, a primary training may be performed on the acoustic model using the objective function of Equation 1, and then a secondary training may be performed on the acoustic model using one of the objective functions of Equations 2 to 5. In another example, both the primary training and the secondary training may be performed on the acoustic model using one of the integrated objective functions of Equations 6 and 7.

The acoustic model storage unit 320 may include as a storage medium any one or any combination of any two or more of a flash memory, a hard disk, a MultiMediaCard (MMC), an MMCmicro, a memory card memory (e.g., an SD memory card or an XD memory card), a RAM, an SRAM, a ROM, an EEPROM, a PROM, a magnetic memory, a magnetic disk, and an optical disk.

In the example in FIG. 3, the acoustic model storage unit 320 is included in the speech recognition apparatus 300, but is not limited thereto. In other words, the acoustic model storage unit 320 may be located inside the speech recognition apparatus 300 as shown in FIG. 3, or may be a separate external component connected to the speech recognition apparatus 300.

The calculator 330 calculates a phoneme probability of the received noisy speech data using the acoustic model stored in the acoustic model storage unit 320. To accomplish this, the calculator 330 includes a feature extractor 331 and a phoneme probability calculator 332.

The feature extractor 331 extracts the feature of the received noisy speech data using a predetermined algorithm. There is no limitation on the type and function of the predetermined algorithm as long as it can extract the feature through which the noisy speech data can be identified from other noisy speech data.

The phoneme probability calculator 332 calculates a probability of a phoneme corresponding to the feature of the noisy speech data extracted by the feature extractor 331 using the acoustic model stored in the acoustic model storage unit 320.

In the example in FIG. 3, the speech recognition apparatus 300 includes the input unit 310 and the acoustic model storage unit 320, but the input unit 310 and the acoustic model storage unit 320 may be omitted according to the performance and application of a system.

Figure 4:
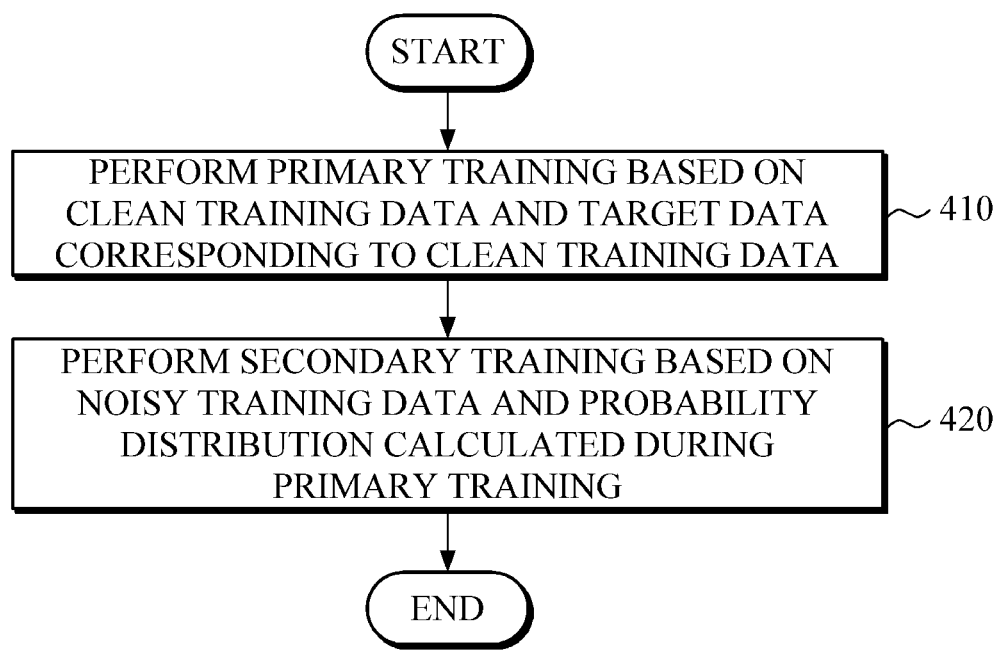
FIG. 4 is a flowchart illustrating an example of a neural network training method.

FIG. 4 is a flowchart illustrating an example of a neural network training method. The neural network training method of FIG. 4 may be performed by the neural network training apparatus 100 of FIG. 1.

Referring to FIGS. 1 and 4, in operation 410, the neural network training apparatus 100 performs a primary training of a neural network model based on clean training data and target data corresponding to the clean training data. For example, the neural network training apparatus 100 performs the primary training of the neural network model using the clean training data as an input and the target data corresponding to the clean training data as a target. The neural network model may be a neural network-based acoustic model including a plurality of hidden layers, but this is a merely an example, and the neural network model is not limited thereto.

In one example, the neural network training apparatus 100 performs the primary training of the neural network model using the objective function (a first objective function) of Equation 1.

In operation 420, the neural network training apparatus 100 performs a secondary training of the neural network model on which the primary training has been performed based on noisy training data and a probability distribution of an output class for the clean training data calculated during the primary training of the neural network model. For example, the neural network training apparatus 100 performs the secondary training of the neural network model on which the primary training has been performed using the noisy training data as an input and the probability distribution of the output class for the clean training data calculated during the primary training of the neural network model as a target. The noisy training data may be data in which the clean training data is distorted, or in which the clean training data and training noise data are mixed. For example, the noisy training data may be data in which the clean training data and a variety of noise data are mixed, or may be distorted data generated by adding a variety of modifications (for example, rotation, partial covering, a change in color or intensity of illumination, or other modifications in the case of image data, and reverberation or other modifications in the case of speech data) to the clean training data.

In one example, the neural network training apparatus 100 performs the secondary training of the neural network model on which the primary training has been performed using one of the objective functions (second objective functions) of Equations 2 to 5.

Although an example in which the neural network training apparatus 100 trains the neural network model using separate objective functions (the first objective function and the second objective function) in a primary training operation 410 and a secondary training operation 420 has been described, the first objective function and the second objective function may be integrated into a single integrated objective function. For example, the neural network training apparatus 100 may perform both the primary training operation 410 and the secondary training operation 420 using the integrated objective function of Equation 6 or 7.

Figure 5:
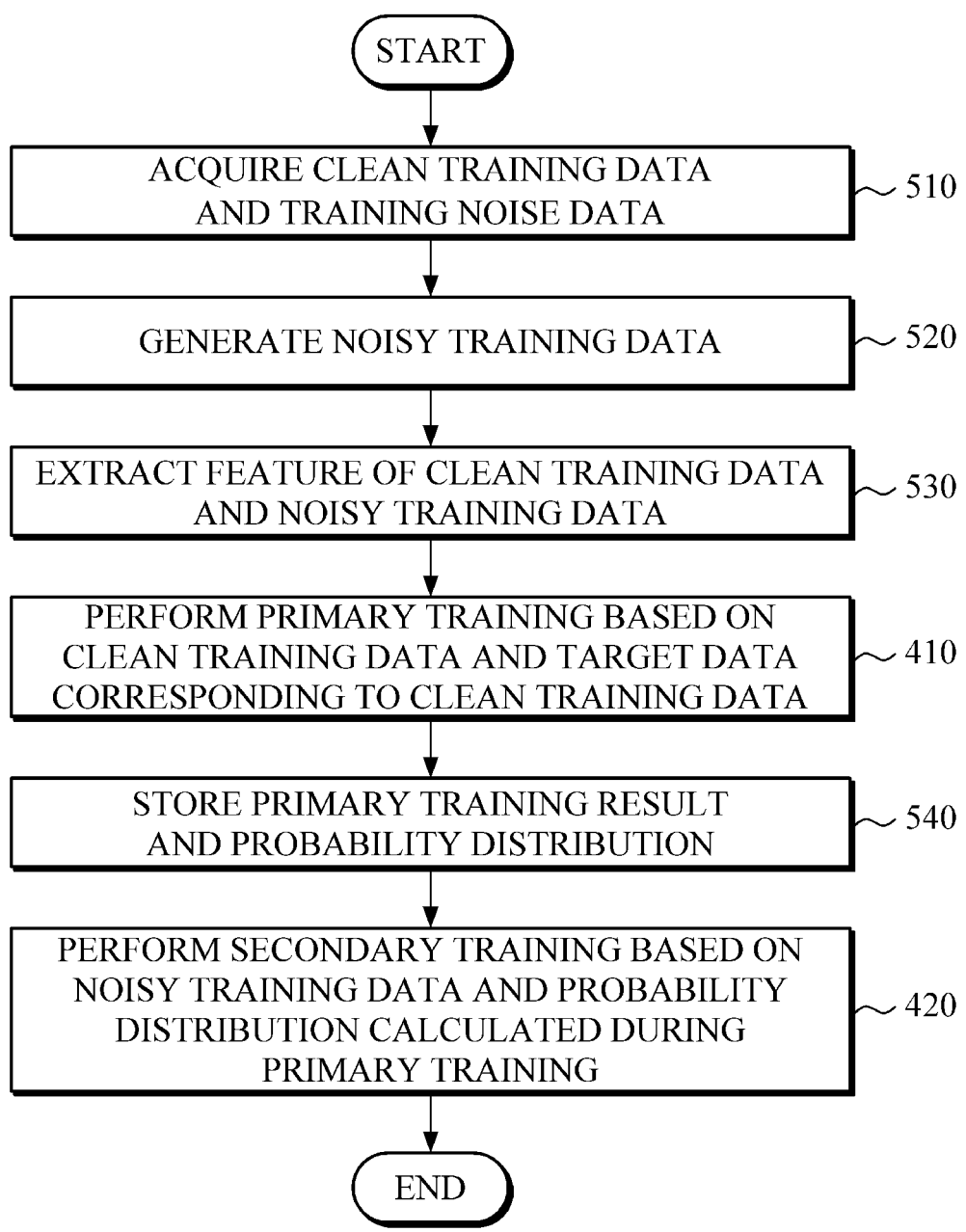
FIG. 5 is a flowchart illustrating another example of a neural network training method.

FIG. 5 is a flowchart illustrating another example of a neural network training method. The neural network training method of FIG. 5 may be performed by the neural network training apparatus 200 of FIG. 2.

When compared to the neural network training method of FIG. 4, the neural network training method of FIG. 5 further includes operation 510 to operation 540. Operations 410 and 420 in FIG. 5 as the same as operations 410 and 420 in FIG. 4, and accordingly repeated descriptions thereof will be omitted.

Referring to FIGS. 2 and 5, in operation 510, the neural network training apparatus 200 acquires clean training data and training noise data for training a neural network model. In one example, the neural network training apparatus 200 acquires the clean training data and the training noise data from a predetermined DB or external device.

In operation 520, the neural network training apparatus 200 generates noisy training data by mixing the clean training data and the training noise data. Alternatively, the neural network training apparatus 200 may generate the noisy training data by adding a variety of modifications (for example, rotation, partial covering, a change in color or intensity of illumination, or the modifications in the case of image data, and reverberation or other modifications in the case of speech data) to the clean training data.

In operation 530, the neural network training apparatus 200 for training the neural network extracts features (for example, a filterbank) of the clean training data and the noisy training data using a predetermined algorithm. There is no limitation on the type and function of the predetermined algorithm as long as it can extract features through which each sample of the clean training data and the noisy training data can be identified from the clean training data and the noisy training data.

In operation 540, the neural network training apparatus 200 stores a primary training result of the primary training of the neural network model and a probability distribution of an output class for the clean training data calculated during the primary training of the neural network model.

Figure 6:
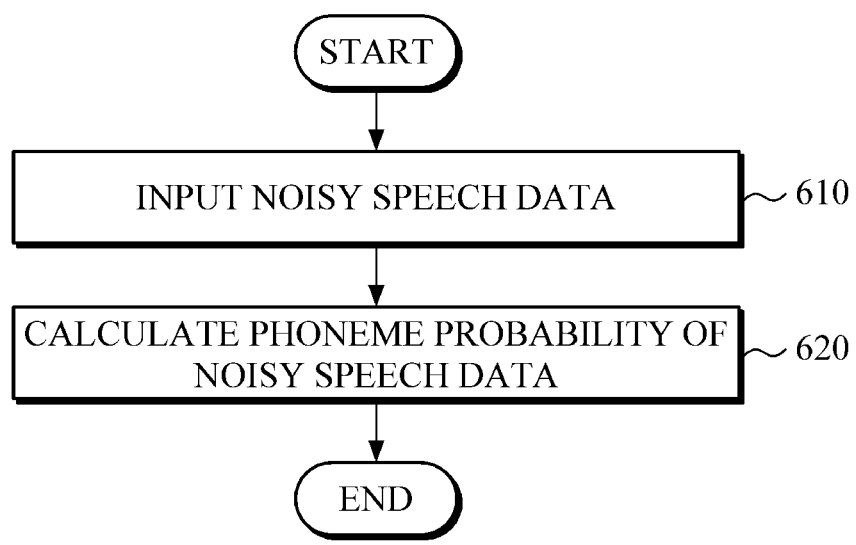
FIG. 6 is a flowchart illustrating an example of a speech recognition method.

FIG. 6 is a flowchart illustrating an example of a speech recognition method. The speech recognition method of FIG. 6 may be performed by the speech recognition apparatus 300 of FIG. 3.

Referring to FIGS. 3 and 6, in operation 610, the speech recognition apparatus 300 receives noisy speech data on which speech recognition is to be performed. The noisy speech data is speech data mixed with noise.

In operation 620, the speech recognition apparatus 300 calculates a phoneme probability of the received noisy speech data using an acoustic model trained in advance.

The acoustic model may be an acoustic model that is trained using an MCT technique as a neural network-based acoustic model. For example, the acoustic model may be an acoustic model on which a primary training has been performed based on speech training data and a phoneme sequence corresponding to the speech training data, and a secondary training has been performed based on noisy speech training data and a probability distribution of an output class for the speech training data calculated during the primary training of the acoustic model. The training noisy speech training data may be data obtained by mixing the speech training data and training noise data.

In one example, the acoustic model is trained using any of the objective functions of Equations 1 to 7. In one example, the primary training is performed on the acoustic model using the objective function of Equation 1, and the secondary training is performed on the acoustic model on which the primary training has been performed using one of the objective functions of Equations 2 to 5. In another example, both the primary training and the secondary training are performed on the acoustic model using one of the integrated objective functions of Equations 6 and 7.

Figure 7:
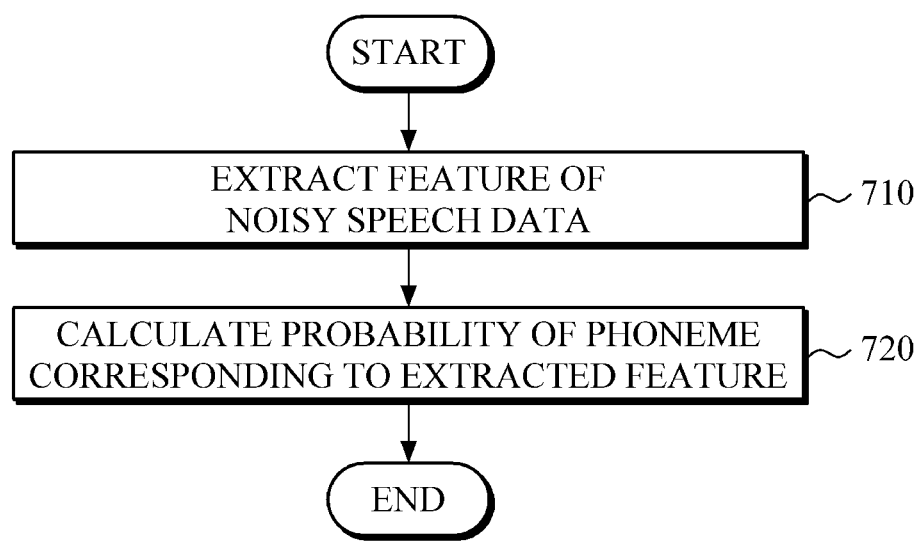
FIG. 7 is a flowchart illustrating an example of a method of calculating a phoneme probability of noisy speech data.

FIG. 7 is a flowchart illustrating an example of a method of calculating a phoneme probability of noisy speech data. The method of calculating a phoneme probability of noisy speech data of FIG. 7 is an example of operation 620 of FIG. 6.

Referring to FIGS. 3 and 7, in operation 710, the speech recognition apparatus 300 extracts a feature of the received noisy speech data using a predetermined algorithm. There is no limitation on the type and function of the predetermined algorithm as long as it can extract a feature by which each sample of the noisy speech data can be identified from other samples of the noisy speech data.

In operation 720, the speech recognition apparatus 300 calculates a probability of a phoneme corresponding to the extracted feature of the noisy speech data using an acoustic model that is trained in advance.

The primary trainer 110 and the secondary trainer in FIGS. 1 and 2, the data acquirer 210, the mixer 220, the extractor 230, and the storage unit 240 in FIG. 2, and the input unit 310, the acoustic model storage unit 320, the feature extractor 331, and the phoneme probability calculator 332 in FIG. 3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network training apparatus comprising:
a processor comprising
a primary trainer configured to
perform a primary training of a neural network model using clean training data and target data corresponding to the clean training data, and
generate, as an output of the primary training, a probability distribution of an output class for the clean training data;
a mixer configured to create noisy training data by mixing the clean training data and training noise data or adding distorted data to the clean training data; and
a secondary trainer configured to perform a secondary training of the neural network model on which the primary training has been performed using the noisy training data and the probability distribution of the output class for the clean training data that is generated during the primary training of the neural network model.

2. The neural network training apparatus of claim 1, wherein the neural network model is a neural network-based acoustic model.

3. The neural network training apparatus of claim 1, wherein the primary trainer is further configured to perform the primary training using a first objective function that performs training of the neural network model to obtain the target data from the clean training data.

4. The neural network training apparatus of claim 1, wherein the secondary training is performed using a second objective function that is a combination of the probability distribution of the output class for the clean training data and an activation function of an output layer of the neural network model.

5. The neural network training apparatus of claim 1, wherein the secondary trainer is further configured to perform the secondary training using a second objective function that is a weighted sum of an objective function that performs training of the neural network model to obtain the target data from the clean training data and an objective function that is a combination of the probability distribution of the output class for the clean training data that is generated during the primary training of the neural network model and an activation function of an output layer of the neural network model.

6. A neural network training method comprising:
performing, by a processor, a primary training of a neural network model using clean training data and target data corresponding to the clean training data;
generating, by the processor and as an output of the primary training, a probability distribution of an output class for the clean training data;
creating, by the processor, noisy training data by mixing the clean training data and training noise data or adding distorted data to the clean training data; and
performing, by the processor, a secondary training of the neural network model on which the primary training has been performed using the noisy training data and the probability distribution of the output class for the clean training data that is generated during the primary training of the neural network model.

7. The neural network training method of claim 6, wherein the neural network model is a neural network-based acoustic model.

8. The neural network training method of claim 6, wherein the performing of the primary training comprises performing the primary training using a first objective function that performs training of the neural network model to obtain the target data from the clean training data.

9. The neural network training method of claim 6, wherein the performing of the secondary training comprises performing the secondary training using a second objective function that is a combination of the probability distribution of the output class for the clean training data that is generated during the primary training of the neural network model and an activation function of an output layer of the neural network model.

10. The neural network training method of claim 6, wherein the performing of the secondary training comprises performing the secondary training using a second objective function that is a weighted sum of an objective function that performs training of the neural network model to obtain the target data from the clean training data and an objective function that is a combination of the probability distribution of the output class for the clean training data that is generated during the primary training of the neural network model and an activation function of an output layer of the neural network model.

11. A computer-readable storage medium storing instructions, that when executed by a processor, cause the processor to perform the method of claim 6.

12. A speech recognition apparatus comprising:
a processor comprising
 a feature extractor configured to extract a feature of noisy speech data; and
 a phoneme probability calculator configured to calculate a probability of a phoneme corresponding to the extracted feature using an acoustic model;
wherein the processor is further configured to generate the acoustic model by
 performing a primary training based on speech training data and a phoneme sequence corresponding to the speech training data using a first objective function that obtains the phoneme sequence from the speech training data,
 generating noisy speech training data by mixing the speech training data and training noise data or adding distorted data to the speech training data,
 performing a secondary training based on the noisy speech training data and a probability distribution of an output class for the speech training data calculated during the primary training of the acoustic model using a second objective function that obtains the probability distribution of the output class for the speech training data from the noisy speech training data.

13. The speech recognition apparatus of claim 12, wherein the acoustic model is a neural network-based acoustic model.

14. The speech recognition apparatus of claim 12, wherein the first objective function performs training of the acoustic model to obtain a phoneme from the speech training data.

15. The speech recognition apparatus of claim 12, wherein the second objective function is a combination of the probability distribution of the output class for the speech training data calculated during the primary training of the acoustic model and an activation function of an output layer of the acoustic model.

16. The speech recognition apparatus of claim 12, wherein the second objective function is a weighted sum of an objective function that performs training of the acoustic model to obtain a phoneme from the speech training data and an objective function that is a combination of the probability distribution of the output class for the speech training data calculated during the primary training of the acoustic model and an activation function of an output layer of the acoustic model.

17. A neural network training apparatus comprising:
a processor comprising
 a primary trainer configured to perform a primary training of a neural network model using clean training data and hard target data;
 a mixer configured to generate noisy training data from the clean training data; and
 a secondary trainer configured to perform a secondary training of the neural network model on which the primary training has been performed using the noisy training data and soft target data obtained as an output of the primary training of the neural network model.

18. The neural network training apparatus of claim 17, wherein the noisy training data is obtained by distorting the clean training data or mixing the clean training data with noise.

19. The neural network training apparatus of claim 17, wherein the soft target data is a probability distribution of an output class for the clean training data calculated during the primary training of the neural network model.

20. The neural network training apparatus of claim 17, wherein the secondary trainer is further configured to perform the secondary training based on the noisy training data, the soft target data, and an activation function of an output layer of the neural network model.

* * * * *